Figure 1:
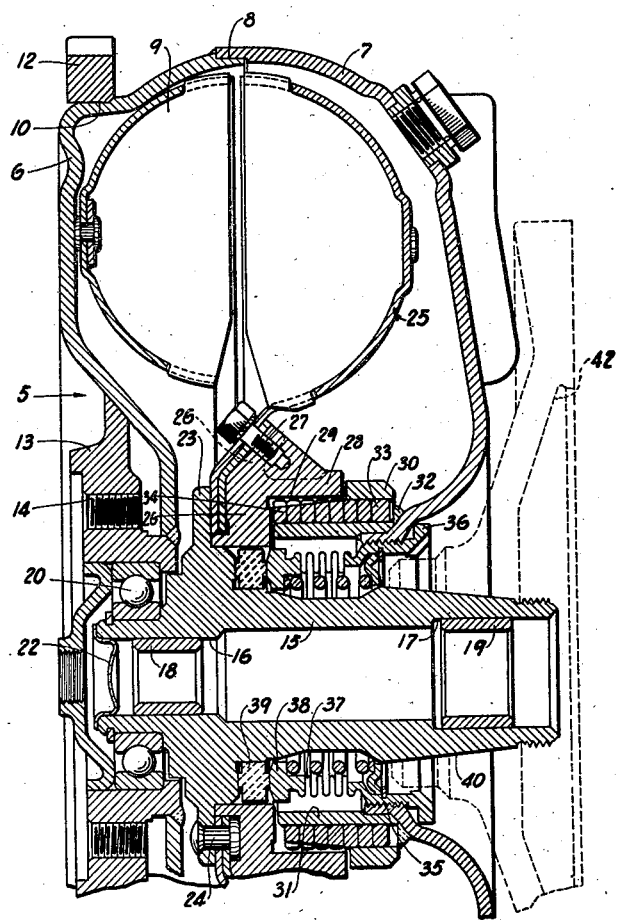

Jan. 1, 1946. H. R. GREENLEE 2,392,040
FLUID COUPLING
Original Filed July 3, 1941

INVENTOR.
Harry R. Greenlee
BY
ATTORNEYS.

Patented Jan. 1, 1946

2,392,040

UNITED STATES PATENT OFFICE 2,392,040

FLUID COUPLING

Harry R. Greenlee, South Bend, Ind., assignor to The Studebaker Corporation, South Bend, Ind., a corporation of Delaware Original application July 3, 1941, Serial No. 400,953. Divided and this application November 22, 1943, Serial No. 511,227

4 Claims. (Cl. 192—3.2)

This invention relates to fluid couplings and more particularly is directed to a fluid coupling construction for use in automobiles or the like in which means is provided for automatically locking up the coupling for direct drive under predetermined speed conditions.

The present application is a division of my copending application Serial No. 400,953, filed July 3, 1941, for Fluid coupling.

It has been found, through considerable experimentation and tests of fluid coupling drives, that after a speed of ten miles per hour has been reached there is little or no necessity for employing a fluid coupling in the drive. Consequently, above this speed the coupling merely produces slippage and reduces the effective torque transmission from the power source to the transmission. This, in turn, produces additional heat which must be dissipated, as well as increasing the load on bearings and reducing the mileage per unit of consumption of fuel.

It is therefore a primary object of the present invention to provide a fluid coupling which may be fully effective to cushion the transmission of power from the engine to the gear train throughout the low speed range of the vehicle where such a coupling is most essential, which coupling, however, is provided with self-contained means which will automatically lock the impeller to the rotor for conjoint rotation when a predetermined speed has been reached. This lock-up is effected independently of any control on the part of the operator and is responsive to speed conditions as sensed by the drive member of the power train of the vehicle.

In a preferred form of the present invention I provide as a means of locking up the fluid coupling a coil spring clutch which is so arranged that it will be centrifugally actuated under predetermined speed conditions to expand into coupling engagement for locking the impeller to the rotor in a one-to-one direct drive. This immediately cuts out the slippage within the coupling and, of course, immediately produces a direct drive therethrough which as a consequence produces gas saving and eliminates the constant heating of the fluid in the coupling with the consequent elimination of any means necessary for cooling such fluid. At the same time, the elimination of this heat allows more effective lubrication of the drive shaft gear bearings and also eliminates the necessity of providing a popoff valve or the like for relieving excess pressure within the coupling since the coupling never reaches a speed when employed in a coupling capacity sufficient to build up a pressure which might have to be relieved.

I have found that with such a construction there is a very material saving in fuel consumption since the elimination of slippage in the coupling after the predetermined speed has been reached greatly reduces the amount of fuel consumed as compared to drives in which the fluid coupling is at all times operative and is producing slippage throughout the complete operating range of the vehicle.

Other objects and advantages of the present invention will appear more fully from the detailed description which, taken in conjunction with the accompanying drawing, will disclose to those skilled in the art the particular construction and operation of a preferred form of the present invention.

Figure 2:
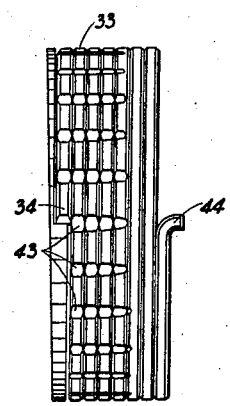

In the drawing:

Figure 1 is a vertical sectional view through a fluid coupling embodying the present invention; and Figure 2 is an elevational view of a form of clutch construction which may be employed for locking up the fluid coupling.

Referring now in detail to the drawing, in Figure 1 I have disclosed at 5, the fluid coupling housing consisting of the stampings 6 and 7, which I secure together by overlapping of the peripheral portions 8, to form an enclosing torus shaped housing. Secured to the stamping 6, internally of the housing is the impeller member 9, which may be of any desired form, and secured about a shoulder 10 on the stamping 6 is the ring gear 12, forming a starting gear for the engine of the vehicle in which the coupling is employed.

The coupling housing 5, is rigidly secured to a ring member 13, which is tapped as at 14 to receive suitable studs for securing the same to the flanged end of the engine crank shaft whereby the housing, including the impeller 9, is directly coupled to the engine crank shaft. Disposed within and extending axially of the housing 5, is the quill or sleeve shaft 15 which has formed therein the bearing seats 16 and 17 receiving the bearings 18 and 19 for rotatably mounting the drive gear and its associated shaft therein. The sleeve 15 at its forward end is journalled by means of the ball bearing assembly 20 in the hub portion of the ring member 13, whereby it is centered axially with respect to the crank shaft of the engine, and a suitable closure cap 22 closes the forward end of the sleeve 15 to prevent passage of the lubricant thereinto from the bearings 20.

The sleeve 15 is provided with the radially extending flange 23 upon which is mounted, by means of suitable rivets 24, the rotor or driven member of the coupling indicated generally at 25. The rotor member 25 has secured to it the annulus or ring member 26 which is suitably tapped as at 27 for receiving screws by which the rotor 25 may be secured thereto. The member 26 is provided with a cylindrical portion 28, having an inner annular clutch surface 29. In this construction the stamping 7 of the impeller has secured thereto the sleeve member 30, being provided with the extended hub portion 31 telescoping within the annular surface 29 of the member 26. The sleeve 30 is welded as at 32 for permanent connection to the stamping 7. A suitable coil spring 33 shown in detail in Figure 2 is carried within a channel shaped recess formed in the member 30 and its free end is disposed between the axially overlapping portions 31 and 29 of the members 30 and 26, respectively. The free end of this spring, when the speed of the member 30 reaches a predetermined point, radially expands into frictional engagement within the surface 29, thereby locking the impeller housing directly to the rotor 25 so that the coupling rotates as a unit and eliminates any slippage therethrough. This inner peripheral portion 35 of the housing is internally threaded to receive a nut 36 which carries at its inner end one end of the flexible bellows member 37, the opposite end of said bellows carrying the ring 38 bearing against the bearing ring 39, this being a more or less conventional oil sealing arrangement for preventing leakage of fluid from within the coupling outwardly along the external surface of the sleeve 15.

The sleeve 15 is provided with a tapered end portion 40 upon which is adapted to be mounted the clutch plate indicated by dotted lines at 42, forming one element of the friction clutch for the vehicle.

Considering in detail the spring 33, it will be noted that adjacent its free end it is provided with external axially directed slots 43. The opposite end 44 of spring 33 is turned at right angles for engaging in a suitable slot in the member 30 for locking engagement with the latter. These slots increase the flexibility of the free end of the spring and allow its radial expansion and centrifugal action without in any way materially detracting from a full annular surface clutching engagement of the spring coils with the adjacent clutch surface. This provides what might be termed a feathering action to prevent the possibility of a shock connection, insuring that the coupling action will occur both smoothly and uniformly under the predetermined speed conditions.

I am aware that various changes may be made in certain details of the present construction and I therefore do not intend to be limited except as defined by the scope and spirit of the appended claims.

I claim:

1. A fluid unit comprising a driving member and a driven member, said driving and driven members having coaxially disposed hub portions, and clutch means comprising a coil spring disposed within said hub portions, said coil spring being fixed to said driving member and adapted to be expanded radially by centrifugal force in response to predetermined speed of rotation of said driving member to clutch said driven member thereto for conjoint rotation.

2. A fluid unit comprising a driving member and a driven member, said driving and driven members having coaxially disposed hub portions, and clutch means comprising a coil spring disposed within said hub portions, said coil spring being fixed to said driving member and having a free end portion adapted to expand radially under centrifugal force in response to predetermined speed of rotation of said driving member to clutch said driven member thereto for conjoint rotation.

3. A fluid unit comprising a driving member and a driven member, said driving and driven members having sleeve portions of different diameter arranged in overlapping relation to provide an annular recess between the external surface of the sleeve portion of the inner one of said members and the internal surface of the sleeve portion of the outer one of said members, the inner one of said members being fixed to said driving member and the outer one of said members being fixed to said driven member, and clutch means comprising a coil spring disposed within the annular recess between the sleeve portions of said members arranged with the longitudinal axis of said coil spring extending coaxially of the longitudinal axes of said members, said coil spring being fixed to said driving member and being adapted to be expanded radially by centrifugal force in response to predetermined speed of rotation of said driving member to clutch said driven member thereto for conjoint rotation.

4. A fluid unit comprising a driving member and a driven member, a coil spring clutch connected at one end to said driving member, an adjacent clutch surface on said driven member, said coil spring clutch being adapted to be expanded radially by centrifugal force in response to predetermined speed of rotation of said driving member into engagement with said adjacent clutch surface of said driven member to clutch said members together for conjoint rotation.

HARRY R. GREENLEE.